US006996257B2

(12) United States Patent
Wang (10) Patent No.: US 6,996,257 B2
(45) Date of Patent: Feb. 7, 2006

(54) METHOD FOR LIGHTING- AND VIEW -ANGLE-INVARIANT FACE DESCRIPTION WITH FIRST- AND SECOND-ORDER EIGENFEATURES

(75) Inventor: Lei Wang, Goleta, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 638 days.

(21) Appl. No.: 10/020,293

(22) Filed: Dec. 18, 2001

(65) Prior Publication Data

US 2002/0114464 A1 Aug. 22, 2002

(30) Foreign Application Priority Data

Dec. 19, 2000 (JP) ............................. 2000-385126

(51) Int. Cl.
*G06K 9/00* (2006.01)
(52) U.S. Cl. ...................... 382/118; 382/115; 340/5.53; 340/5.83
(58) Field of Classification Search ................ 382/118, 382/190, 117, 115; 340/5.53, 5.83
See application file for complete search history.

(56) References Cited

U.S. PATENT DOCUMENTS

| 5,164,992 | A | * | 11/1992 | Turk et al. ................... 382/118 |
| 5,561,718 | A | | 10/1996 | Trew |
| 5,710,833 | A | * | 1/1998 | Moghaddam et al. ....... 382/228 |
| 5,802,208 | A | | 9/1998 | Podichuk et al. |
| 6,292,575 | B1 | | 9/2001 | Bortolussi et al. |
| 6,430,306 | B2 | * | 8/2002 | Slocum et al. .............. 382/118 |

FOREIGN PATENT DOCUMENTS

| EP | 1087533 | 3/2001 |
| JP | 10-055444 | 2/1998 |
| JP | 2000-022961 | 1/2000 |
| JP | 2000-101437 | 4/2000 |

OTHER PUBLICATIONS

L. Wang et al., "Experimental Results of Face Description based on the $2^{nd}$ order Eigenface Method," ISO/IEC JTC1/SC29/WG11 MPEG2000/M6001, May 2000, pp. 1-35.
L. Wang et al., "New Proposal for Face Feature Description, " ISO/IEC JTC1/SC29/WG11 MPEG2000/M5750, Mar. 2000, pp. 1-6.
CD 15938-3 MPEG-7 Multimedia Content Description Interface-Part 3 Visual, ISO/IEC JTC1/SC29/WG11/W3703, Oct. 2000, pp. 1-183.
T. Shakunaga et al., "Decomposed Eigenface for Face Recognition Under Various Lighting Conditions," Proceedings 2001 IEEE Conference on Computer Vision and Pattern Recognition, 2001, pp. 864-871.
H.-C. Kim et al., "Proposal for Face Description Using $2^{nd}$-order PCA Mixture Model," ISO/IEC JTC1/SC29/WG11 MPEG2001/M7286, Jul. 2001, pp. 1-8.

(Continued)

*Primary Examiner*—Bhavesh M. Mehta
*Assistant Examiner*—John B. Strege
(74) *Attorney, Agent, or Firm*—Greenblum & Bernstein, P.L.C.

(57) ABSTRACT

This invention provides a method to interpret and recognize huma faces. The $2^{nd}$-order eigenfeatures are used for lighting-invariant face description and both the $1^{st}$-order and $2^{nd}$-order eigenfeatures are used for view-angle-invariant face description. After normalization and quantization, these features can describe face effectively and efficiently. In order to further reduce the size of face descriptor, variable length code can be used to encode the quantized eigenfeatures. This invention can be used in internet multimedia database retrieval, digital library, video editing, surveillance and tracking, and other applications using face recognition and verification.

34 Claims, 5 Drawing Sheets

OTHER PUBLICATIONS

T. Kamei et al., "Extension of the Face Recognition Descriptor Using a Confidence Factor," ISO/IEC JTC1/SC29/WG11 MPEG2001/M7689, Dec. 2001, pp. 1-9.

H.-C Kim et al., "Face Retrieval Using $1^{st}$-and $2^{nd}$-order PCA Mixrture Model," Proceedings 2002 International Conference on Image Processing, 2002, pp. 605-608.

M.-S. Kim et al., "Face Recognition Using the Embedded HMM with Second-order Block-specific Observations," Pattern Recognition, vol. 36, 2003, pp. 2723-2735.

English language Abstract of JP2000-101437.

English language Abstract of JP2000-022961.

O. Hori, "Face Detection in Various Images Based on a Statistics Approach", Computer Vision and Image Media, Jul. 25, 1997, pp. 139-146, together with an English language abstract of the same.

\* cited by examiner

METHOD FOR LIGHTING- AND VIEW-ANGLE-INVARIANT FACE DESCRIPTION WITH FIRST- AND SECOND-ORDER EIGENFEATURES

BACKGROUND OF THE INVENTION

This invention relates to a method for lighting- and view-angle-invariant face description with first- and second-order eigenfeatures, and can be used in face description and recognition for content-based image retrieval, huma face identification and verification for bank, security system, and video phone, surveillance and tracking, digital library, and internet multimedia database.

Human face perception is an active area in the computer vision community. Face recognition will play an important role in multimedia database search and many other applications. In recent years considerable progress has been made on the problems of face detection and recognition. Different specific techniques were proposed. Among these, neural nets, elastic template matching, Karhunen-Loeve expansion, algebraic moments and isodensity lines are typical methods.

Among these methods, Principal component analysis (PCA) or Karhunen-Loeve expansion is an important branch. Eigenface method is derived from PCA and it is convenient to be computed and has consistent accuracy in identification. Prior work showed that the PCA approach dissociates spontaneously between different types of information. The eigenvectors with large eigenvalues capture information that is common to subsets of faces and eigenvectors with small eigenvalues capture information specific to individual face. The studies show that only the information contained by the eigenvectors with large eigenvalues can be generalized to new faces that are not trained.

The advantage of eigenface method is that eigenvectors with large eigenvalues convey information relative to the basic shape and structure of the faces. That means features extracted from eigenvectors with large eigenvalues can be used to describe major characteristics of human faces. However, this is also the weakness of PCA. If we only consider the features extracted from eigenvectors with large eigenvalues, we cannot get the details of the faces which corresponds to individual faces. If these details of individual face can be described with the common features of human faces, the description of human faces can be more accurate.

Furthermore, it is difficult to get suitable eigenvectors to represent human faces if the face images are taken under different lighting conditions and different view-angles. According to our experience, the regular eigenface method is not excellent in recognizing faces under different lighting condition. However, many face images of the same person are taken under different lighting and view-angle conditions. The lighting-invariant and view-angle-invariant face description is still an important field to be explored.

SUMMARY OF THE INVENTION

Eigenface method is effective to extract common face characteristics such as shape and structure. In order to get details of faces that are lost when eigenvectors with small eigenvalues are truncated, the reconstructed faces with the features from eigenvectors with large eigenvalues should be obtained. With the reconstructed face images, the residue images between original images and reconstructed images can be obtained. These residue faces can be looked as high-passed face images which still contain rich detailed information for individual faces. In order to describe these residue faces, eigenface method can be used on these residue faces again. The obtained eigenvectors with large eigenvalues will reveal the common characteristics of residue faces. With this method, the second-order eigenvectors with large eigenvalues can be obtained to extract corresponding features. According to our experiments, first-order and second-order eigenfeatures are both effective for the view-angle-invariant face description, while the second-order eigenfeatures are also effective for the lighting-invariant face description. Therefore, the combination of first-order and second-order eigenfeatures can be used for view-angle-invariant face description and the second-order eigenfeatures can be used for lighting-invariant face description. Another way to describe face is to use first-order eigenfeatures exclusively. For lighting-invariant face description, only the eigenfeatures extracted from the eigenfaces with the top k-th to N-th largest eigenvalues (where 0<k<N) to avoid the lighting variance coming from the top k eigenfaces with largest eigenvalues. The view-angle-invariant face features can be the eigenfeatures extracted from the eigenfaces corresponding to the top N largest eigenvalues.

Besides, when we consider face description, an important characteristic is symmetry of faces. The faces of most of the people are symmetric. Thus we can consider to use the left-right mirrored face image to represent the same person. Consequently the eigenfeatures of the original image and the mirrored image can both represent the same person. Therefore, we can use the linear combination of the eigenfeatures of the two images to represent the original image. In order to discriminate between the original image and the mirrored image, different weights can be used to combine the eigenfeatures.

The present invention provides two methods for lighting-invariant and view-angle-invariant human face description which can be used for image retrieval (query by face example), person identification and verification, surveillance and tracking, and other face recognition applications. In order to describe face characteristics, the concept of second-order eigenfaces is proposed according to our observation and derivation. At first, the first-order eigenfaces and second-order eigenfaces can be derived from a set of training face images. Then the eigenfaces can be adjusted with the characteristic of symmetry of faces. With these adjusted eigenfaces, the adjusted first-order and second-order eigenfeatures can be obtained. The combination of these eigenfeatures can be used to describe faces. With this description, Euclidean distance can be used for similarity measurement.

DETAILED DESCRIPTION OF THE PREFERRED EMBODIMENTS

According to the present invention, first-order Eigenface and second-order Eigenface are obtained.

Figure 2:
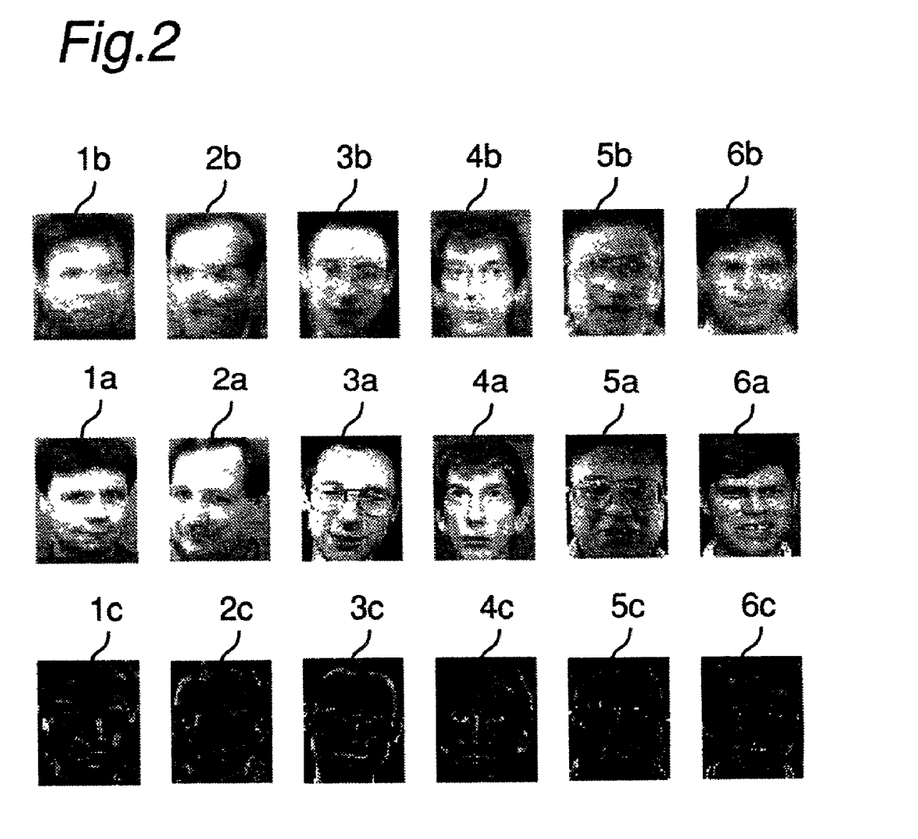
FIG. 2 is a diagram for generating the view-angle-invariant face descriptor.

In FIG. 2, the face pictures 1a, 2a, 3a, 4a, 5a and 6a shown in the middle row are original face images captured by a digital camera without any particular processing. The face picture 1a can be expressed, by using one dimensional vector, as an original face image $\Phi_1$. Similarly, face pictures 2a, 3a, 4a, 5a and 6a can be expressed respectively, as original face images $\Phi_2$, $\Phi_3$, $\Phi_4$, $\Phi_5$, and $\Phi_6$. Generally, the original face image ia is expressed as $\Phi_i$.

In the example shown in FIG. 2, when one dimensional vectors of the six original face images are added and the sum is divided by six, an average image $\Psi$ is obtained, as given below.

$$\Psi=(\Phi_1+\Phi_2+\Phi_3+\Phi_4+\Phi_5+\Phi_6)/6$$

A difference between the one dimensional vector $\Phi_1$ of the face picture 1a and the average image $\Psi$ is expressed as $\Gamma_1^{(1)}$. A similar differences $\Gamma_2^{(1)}$, $\Gamma_3^{(1)}$, $\Gamma_4^{(1)}$, $\Gamma_5^{(1)}$, $\Gamma_6^{(1)}$ can be obtained for other face pictures 2a, 3a, 4a, 5a and 6a, respectively. Thus, the following equations are obtained.

$$\Gamma_1^{(1)}=\Phi_1-\Psi$$
$$\Gamma_2^{(1)}=\Phi_2-\Psi$$
$$\Gamma_3^{(1)}=\Phi_3-\Psi$$
$$\Gamma_4^{(1)}=\Phi_4-\Psi$$
$$\Gamma_5^{(1)}=\Phi_5-\Psi$$
$$\Gamma_6^{(1)}=\Phi_6-\Psi$$

As will be described later, the difference $\Gamma_1^{(1)}$ will be used as a base for obtaining the first-order feature component $w_1^{(1)}$. Similarly, $\Gamma_2^{(1)}$, $\Gamma_3^{(1)}$, $\Gamma_4^{(1)}$, $\Gamma_5^{(1)}$, $\Gamma_6^{(1)}$ will be used as bases for obtaining the first-order feature components $w_2^{(1)}$, $w_3^{(1)}$, $w_4^{(1)}$, $w_5^{(1)}$ and $w_6^{(1)}$. In these formulas, the superscript (1) indicates that the formulas are related to the first-order feature.

When the differences $\Gamma_1^{(1)}$, $\Gamma_2^{(1)}$, $\Gamma_3^{(1)}$, $\Gamma_4^{(1)}$, $\Gamma_5^{(1)}$, $\Gamma_6^{(1)}$ are processed in a low pass filter, reconstructed matrixes $\Gamma_1^{(1)}$, $\Gamma_2^{(1)}$, $\Gamma_3^{(1)}$, $\Gamma_4^{(1)}$, $\Gamma_5^{(1)}$, and $\Gamma_6^{(1)}$ are obtained.

In FIG. 2, the face pictures 1b, 2b, 3b, 4b, 5b and 6b shown in the top row are reconstructed face images obtained by adding the average image $\Psi$ to each of the reconstructed matrixes $\Gamma_1^{(1)}$, $\Gamma_2^{(1)}$, $\Gamma_3^{(1)}$, $\Gamma_4^{(1)}$, $\Gamma_5^{(1)}$ and $\Gamma_6^{(1)}$. The reconstructed face images 1b, 2b, 3b, 4b, 5b and 6b can be expressed as $\Phi_1$, $\Phi_2$, $\Phi_3$, $\Phi_4$, $\Phi_5$ and $\Phi_6$ respectively, as given below.

$$\Phi_1=\Psi+\Gamma_1^{(1)}$$
$$\Phi_2=\Psi+\Gamma_2^{(1)}$$
$$\Phi_3=\Psi+\Gamma_3^{(1)}$$
$$\Phi_4=\Psi+\Gamma_4^{(1)}$$
$$\Phi_5=\Psi+\Gamma_5^{(1)}$$
$$\Phi_6=\Psi+\Gamma_6^{(1)}$$

Since the reconstructed face images contains data that have been processed in the low pass filter so that the high frequency information is removed, the face information will not vary even if the angle of the face should be changed slightly.

In FIG. 2, the face pictures 1c, 2c, 3c, 4c, 5c and 6c shown in the bottom row are residue images $\Gamma_i^{(2)}$, which are obtained by subtracting the reconstructed face images from the original face images. Thus, the following equations can be obtained.

$$\Gamma_1^{(2)}=\Phi_1-\Phi_1=\Gamma_1^{(1)}-\Gamma_1^{(1)}$$
$$\Gamma_2^{(2)}=\Phi_2-\Phi_2=\Gamma_2^{(1)}-\Gamma_2^{(1)}$$
$$\Gamma_3^{(2)}=\Phi_3-\Phi_3=\Gamma_3^{(1)}-\Gamma_3^{(1)}$$
$$\Gamma_4^{(2)}=\Phi_4-\Phi_4=\Gamma_4^{(1)}-\Gamma_4^{(1)}$$
$$\Gamma_5^{(2)}=\Phi_5-\Phi_5=\Gamma_5^{(1)}-\Gamma_5^{(1)}$$
$$\Gamma_6^{(2)}=\Phi_6-\Phi_6=\Gamma_6^{(1)}-\Gamma_6^{(1)}$$

During the process of obtaining the residue images, the brightness information, caused by the lighting system, contained in the original face image and the same brightness information contained in the reconstructed face image are counterbalanced by the subtraction. Thus, the residue images will not be influenced by the lighting system.

The present invention will be further described using general formulas.

Figure 1:
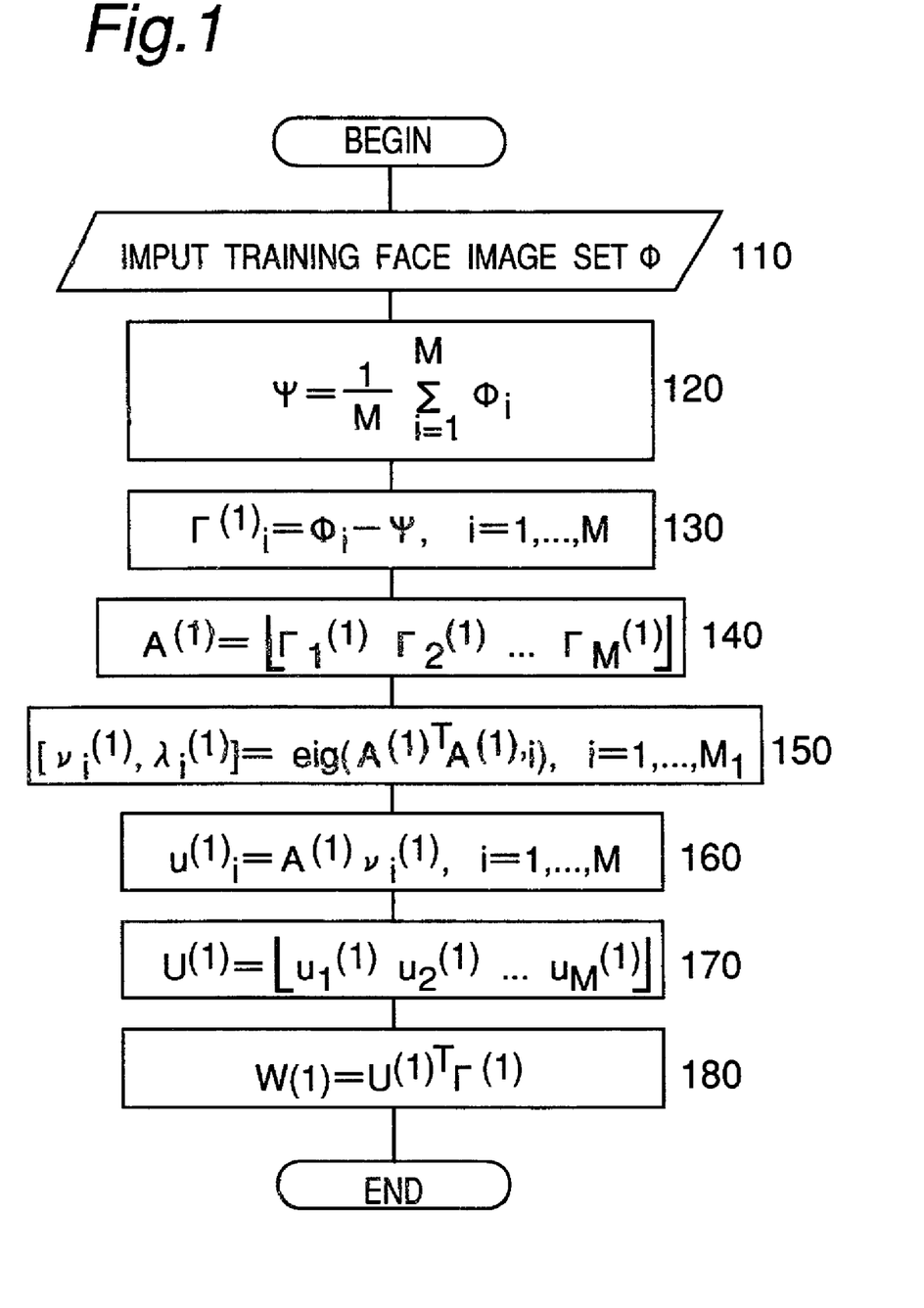
FIG. 1 is a diagram for generating the light-invariant face descriptor.

Consider an image $\Phi_i$ among a collection of M images (in the above example, six images)(step 110 in FIG. 1), where $\Phi_i$ is a one dimensional vector of raster-scanned image, define $\Psi$ as the average image (step 120 in FIG. 1):

$$\Psi = \frac{1}{M}\sum_{i=1}^{M}\Phi_i \quad (1)$$

Every image differs from the average image by a vector rim $\Gamma_i^{(1)}=\Phi_i-\Psi$ (step 130 in FIG. 1). The covariance matrix of the data is thus defined as:

$$Q = A^{(1)}A^{(1)^T} \quad (2)$$

where $A^{(1)}=[\Gamma_1^{(1)}\Gamma_2^{(1)} \ldots \Gamma_M^{(1)}]$.

This is shown in step 140 in FIG. 1.

Note that Q has dimension wh×wh where w is the width of the image and h is the height. The size of this matrix is enormous, but since we only sum up a finite number of image vectors M, the rank of this matrix can not exceed M−1. We note that if $v_i^{(1)}$ is the eigenvector of $A^{(1)^T}A^{(1)}$ (i=1,2, . . . ,M) (step 150 in FIG. 1), then $A^{(1)^T}A^{(1)}v_i^{(1)}=\lambda_i^{(1)}v_i^{(1)}$ where $\lambda_i^{(1)}$ are the eigenvalue of $A^{(1)^T}A^{(1)}$, then $A^{(1)}v_i^{(1)}$ are the eigenvectors of $A^{(1)}A^{(1)^T}$ as we see by multiplying on the left by $A^{(1)}$ in the previous equation:

$$A^{(1)}A^{(1)^T}A^{(1)}v_i^{(1)}=A^{(1)}\lambda_i^{(1)}v_i^{(1)}=\lambda_i^{(1)}A^{(1)}v_i^{(1)}$$

But $A^{(1)^T}A^{(1)}$ is only of size M×M. So defining $u_i^{(1)}$ the eigenvector of $A^{(1)}A^{(1)^T}$ we have $$u_i^{(1)} = A^{(1)}v_i^{(1)} = \sum_{k=1}^{M}v_{ik}^{(1)}\Gamma_k^{(1)}$$

The eigenvalue $\lambda_i^{(1)}$ is the variance along the new coordinate space spanned by eigenvectors $u_i^{(1)}$ (step 160 in FIG. 1). From here on we assume that the order of i is such that the eigenvalues $\lambda_i^{(1)}$ are decreasing. The eigenvalues are decreasing in exponential fashion. Therefore we can project a face image $\Gamma^{(1)}$ onto only $M_1 \ll M$ dimensions by computing $W^{(1)}=\{w_k^{(1)}\}$ where $w_k^{(1)}=u_k^{(1)^T}\Gamma^{(1)}$ and $1 \le k \le M_1$. $w_k^{(1)}$ is the k-th coordinate of $\Gamma^{(1)}$ in the new coordinate system. In this context, $W^{(1)}$ is called first-order features. The vectors $u_k^{(1)}$ are actually images, and are called first-order eigenfaces (in general, it is called eigenfaces in other documents). Let $U^{(1)}=[u_1^{(1)} u_2^{(1)} \ldots u_{M_1}^{(1)}]$ (step 170 in FIG. 1), then $$W^{(1)} = U^{(1)T} \Gamma^{(1)} \qquad (3)$$

This is shown in step 180 in FIG. 1.

Figure 3:
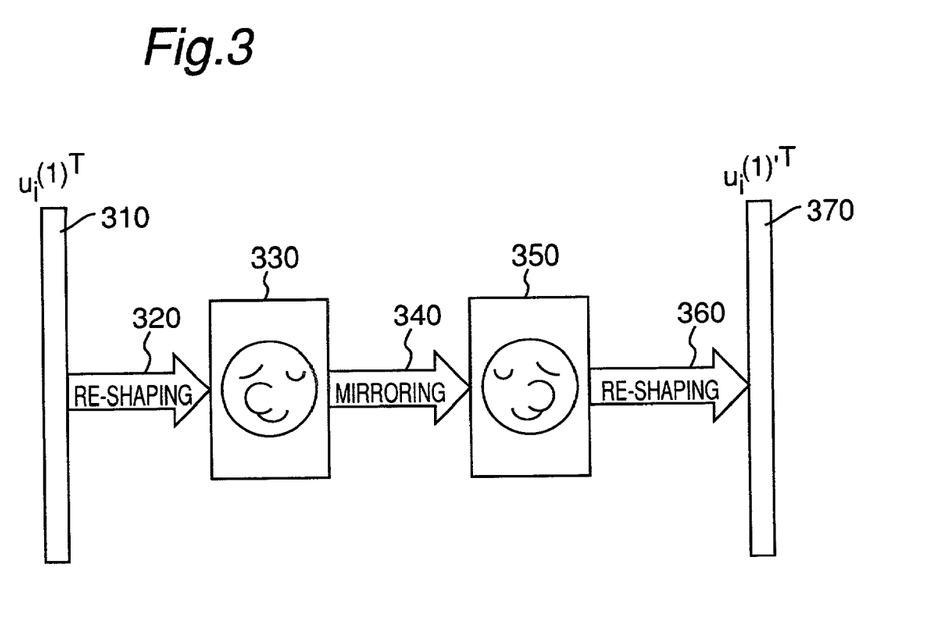
FIG. 3 shows the procedure to mirror an eigenface.

FIG. 3 shows the procedure for computing first-order features $W^{(1)}$. In the figure, eig(B,i) is the function to compute the $i^{th}$ largest eigenvalue and its corresponding eigenvector of matrix. 320 is re-shaping, 340 is mirroring and 360 is re-shaping.

From Eq.(3), an interesting byproduct is that we can get a reconstructed matrix from $W^{(1)}$. Since $U^{(1)}$ is an $M_1 \times P$ matrix, we cannot get its inverse. However, we can use its pseudo inverse to approximate its inverse. Let $U^{(1)+}$ be the pseudo-inverse of $U^{(1)T}$, then $$\Gamma^{(1)} = U^{(1)+} W^{(1)} \qquad (4)$$

where $\Gamma^{(1)}$ is the reconstructed matrix from $W^{(1)}$ and $U^{(1)}$. FIG. 2 gives some original face images and their corresponding reconstructed face images with $M_1=25$. The top images are the reconstructed face images ($\Phi_i = \Gamma_i^{(1)} + \Psi$), the middle images are the corresponding original face images, and the bottom images are the residue images ($\Gamma_i^{(2)} = \Gamma_i^{(1)} - \Gamma_i^{(1)}$). From the reconstructed matrices, we can find that the details of the faces are lost. That means what $W^{(1)}$ describe can be looked as low-pass filtered images. The residue images are the corresponding high-pass filtered images. Observing the reconstructed matrices, some images cannot be reconstructed on a reasonable resolution which indicate that first-order features cannot describe these images well. The worse the reconstructed matrices is, the more information is reserved in residue image. Since these residue images still contains rich information for the individual image, face features should be extracted from these residue faces again.

Let $A^2 = [\Gamma_1^{(2)} \Gamma_2^{(2)} \ldots \Gamma_M^{(2)}]$, $\lambda_i^{(2)}$ be the eigenvalues of $A^{(2)T} A^{(2)}$ and $v_i^{(2)}$ be the corresponding eigenvectors of $A^{(2)T} A^{(2)}$. Then $A^{(2)T} A^{(2)} v_i^{(2)} = \lambda_i^{(2)} v_i^{(2)}$. Based on the discussion above, the eigenvectors of $A^{(2)} A^{(2)T}$ are $u_i^2 = A^{(2)} v_i^2$). Therefore we can project a residue face image $\Gamma^{(2)}$ onto only $M_2 << M$ dimensions by computing $W^{(2)} = \{w_k^{(2)}\}$, where $$w_k^{(2)} = u_k^{(2)T} \Gamma^{(2)} \qquad (5)$$

and $1 \leq k \leq M_2$. Since $u_k^{(2)}$ are the eigenvectors of the residue face image, we call $u_k^{(2)}$ the second-order eigenfaces and $w_k^{(2)}$ the second order features.

Let $U^{(2)} = [u_1^{(2)} u_2^{(2)} \ldots u_{M_2}^{(2)}]$, Eq.(5) can be written as $$\begin{aligned} W^{(2)} &= U^{(2)T} \Gamma^{(2)} \\ &= U^{(2)T} (\Gamma^{(1)} - \hat{\Gamma}^{(1)}) \\ &= U^{(2)T} (\Gamma^{(1)} - U^{(1)+} W^{(1)}) \\ &= U^{(2)T} (\Gamma^{(1)} - U^{(1)+} U^{(1)T} \Gamma^{(1)}) \\ &= (U^{(2)T} - U^{(2)T} U^{(1)+} U^{(1)T}) \Gamma^{(1)} \end{aligned} \qquad (6)$$

Let $U_2 = (U^{(2)T} - U^{(2)T} U^{(1)+} U^{(1)T})^T$ then $$W^{(2)} = U_2^T \Gamma^{(1)} \qquad (7)$$

Since $U_2$ is a constant transform matrix and it is just calculated once, it will not effect the efficiency of computation. The face images can be described with $\Omega(\Phi) = [w_1^{(1)}, w_2^{(1)}, \ldots, w_{M_1'}^{(1)}, w_1^{(2)}, \ldots, w_{M_2}^{(2)}]^T$, where $1 \leq M_1' \leq M_1$. The computational burden does not increase in computing $\Omega(\Phi)$ compared with only computing features from eigenfaces U. For the convenience of discussion, the residue images are called second-order residue image and the original face images are called first-order residue images (though it seems it is better to call the original images as $0^{th}$-order residue images).

The first-order eigenfeatures describe the characteristics of original images and the second-order eigenfeatures depict the characteristics of high-passed images. These characteristics can be used for different applications.

In lighting-invariant case, the view-angles of the images are almost the same, but the lighting conditions are different. The light can come from left, right, or both. Also the faces can be light or dark. In this situation, the features of images should be extracted after filtering. The original face image contains data of lighting feature, and the first-order eigenfeature also contains data of lighting feature. That means the first-order eigenfeatures are not suitable in this case. The second-order eigenfeature is obtained by subtracting the first-order eigenfeature from the original face image, thus removing the data of lighting feature. Thus, the second-order eigenfeatures have no influence by the lighting, and are suitable for use in face recognition that does not influenced by the lighting. On the other hand, when we consider view-angle-invariant case, the images of the same person are taken under the almost the same lighting condition but the view-angles or poses are not the same. In this situation, both the first-order and second-order eigenfeatures are important to describe the faces.

The first-order eigenfeature is obtained by processing the original face image through a low pass filter to extract, not the detail, but general feature of the face. Thus the first-order eigenfeature can provide approximately the same feature even if face images are obtained in different view-angles. Thus, in the cases where the view-angles may change, the first-order eigenfeature is used in addition to the second-order eigenfeature so as to obtain features which will not be influenced by the view-angle.

Therefore we will use second-order eigenfeatures as face descriptor to describe lighting-invariant situation and both of the first-order and second-order eigenfeatures as face descriptor to describe view-angle-invariant situation.

When we consider face description, an important characteristic is symmetry of faces. The faces of most of the people are symmetric. Thus we can consider to use the mirrored face image to represent the same person. Thus the eigenfeatures of the original image and the mirrored image can both represent the same person. Therefore, we can use the linear combination of the eigenfeatures of the two images to represent the original image. In order to discriminate between the original image and the mirrored image, different weights can be used to calculate features.

Suppose $\Phi$ be the original image and $\Phi'$ be the mirrored image of $\Phi$. Then the adjusted eigenfeature should be $$\overline{w}_i^{(1)}(\Phi) = w_i^{(1)}(\Phi) + c \cdot w_i^{(1)}(\Phi')$$

and $$\overline{w}_i^{(2)}(\Phi) = w_i^{(2)}(\Phi) + c \cdot w_i^{(2)}(\Phi')$$

where $0 \leq c \leq 1$ is the weight for adjustment. In order to simplify the computation, the computational order can be rearranged.

Since $w_i^{(1)}(\Phi')=u_i^{(1)^T}\Gamma'^{(1)}=u_i^{(1)'^T}\Gamma^{(1)}$, $$\bar{w}_i^{(1)}(\Phi) = w_i^{(1)}(\Phi) + c \cdot w_i^{(1)}(\Phi')$$
$$= u_i^{(1)^T}\Gamma^{(1)} + c \cdot u_i^{(1)'^T}\Gamma^{(1)}$$
$$= \left(u_i^{(1)^T} + c \cdot u_i^{(1)'^T}\right)\Gamma^{(1)}$$

where $u_i^{(1)'^T}$ is the mirrored eigenface of $u_i^{(1)^T}$. FIG. 1 shows the procedure to get $u_i^{(1)'^T}$ from $u_i^{(1)^T}$. With the same method, we can obtain $$\bar{W}^{(1)} = U^{(1)^T}\Gamma^{(1)} + c \cdot U^{(1)^T}\text{flip}(\Gamma^{(1)}) \quad (8)$$
$$= U^{(1)^T}\Gamma^{(1)} + c \cdot \text{flip}(U^{(1)^T})\Gamma^{(1)}$$
$$= (U^{(1)^T} + c \cdot \text{flip}(U^{(1)^T}))\Gamma^{(1)}$$
$$= \bar{U}_1\Gamma^{(1)}$$

and $$\bar{W}^{(2)} = U_2^T\Gamma^{(1)} + c \cdot U_2^T\text{flip}(\Gamma^{(1)}) \quad (9)$$
$$= U_2^T\Gamma^{(1)} + c \cdot \text{flip}(U_2^T)\Gamma^{(1)}$$
$$= (U_2^T + c \cdot \text{flip}(U_2^T))\Gamma^{(1)}$$
$$= \bar{U}_2\Gamma^{(1)}$$

where mirror( ) is the mirror function to mirror matrix in left/right direction. With Eq.(8) and Eq.(9), the first-order eigenfaces and second-order eigenfaces and can be adjusted to $\bar{U}_1$ and $\bar{U}_2$.

The eigenfeatures discussed above can be used to describe huma faces effectively. However, if the eigenfeatures are looked as features for face recognition or related application, the eigenfeatures should be normalized since the range of the eigenfeatures are not the same.

One of the reasonable normalization method is to divide the eigenfeatures by the corresponding standard deviation of eigenfeatures in the training set. Let $\sigma_i^{(j)}$ be the standard deviation of $w_i^{(j)}$ in the training set, where j=1,2 denotes the first- or second-order eigenfeatures. Then normalized eigenfeatures of image $\Phi$ are $$\tilde{w}_i^{(j)}(\Phi) = \frac{\bar{w}_i^{(j)}(\Phi)}{\sigma_i^{(j)}}$$

The similarity of face images is simply defined as the weighted distance between normalized projections:

$$\delta(\Phi_1, \Phi_2) = \quad (10)$$
$$\sum_{i=1}^{M_1'}\|a_i^{(1)}(\tilde{w}_i^{(1)}(\Phi_1) - \tilde{w}_i^{(1)}(\Phi_2))\| + \sum_{j=1}^{M_2}\|a_j^{(2)}(\tilde{w}_j^{(2)}(\Phi_1) - \tilde{w}_j^{(2)}(\Phi_2))\|$$

If $\alpha_i^{(1)}=0$, the similarity of face images will be measured only with second-order eigenfeatures for lighting-invariant face description. For view-angle-invariant case, both first- and second-order eigenfeatures are necessary. The weights are chosen as follows:

$$a_i^{(1)} = \text{round}\left(\frac{\sqrt{\sigma_i^{(1)}}}{100}\right) \text{ and } a_j^{(2)} = \text{round}\left(\frac{\sqrt{\sigma_j^{(2)}}}{100}\right)$$

The weights can also select other numbers according the applications. In fact, the weights can be embedded into adjusted eigenfaces to reduce the computation, and the normalization parameters can also been moved to eigenface matrix. In order to save the storage, the eigenface matrix and eigenfeatures should be quantized into integers from floating points.

$$\text{Let } \hat{u}_i^{(j)} = \text{Round}\left(a_i^{(j)}\frac{u_i^{(j)}}{\sigma_i^{(j)}}R^{(j)}\right), \text{ where } R^{(j)} = \frac{128}{\max_i\left(\text{abs}\left(a_i^{(j)}\frac{u_i^{(j)}}{\sigma_i^{(j)}}\right)\right)},$$

and Round( ) is the round function, and j=1,2. The eigenfeatures can be quantized with $$\hat{w}_i^{(j)}(\Phi) = \begin{cases} -128, & \text{if } \text{Round}(d^{(j)}\hat{u}_i^{(j)}\Gamma^{(1)}) < -128 \\ 127, & \text{if } \text{Round}(d^{(j)}\hat{u}_i^{(j)}\Gamma^{(1)}) > 127 \\ \text{Round}(d^{(j)}\hat{u}_i^{(j)}\Gamma^{(1)}), & \text{otherwise} \end{cases} \quad (10\text{-}1)$$

where $$d^{(j)} = \frac{128}{\max_{i,k}\left(\text{abs}\left(\frac{\hat{u}_i^{(j)}}{R^{(j)}}\Gamma_k\right)\right)R^{(j)}},$$

$\Gamma_k$ is the images in the training set. The feature set can be written as $$\hat{W}^{(1)} = \{\hat{W}_i^{(1)}\} \text{ and } \hat{W}^{(2)} = \{\hat{W}_j^{(2)}\}.$$

Therefore, each eigenfeature can be quantized to 8 bits.

Further in order to reduce the size of total eigenfeatures, the eigenfeatures can be re-quantized according to their standard deviation of the training set. This can be considered as the trade-off between the size of face descriptor and the retrieval accuracy. According to our experiments, the bits for each eigenfeature can be allocated as follows:

$$N_i^{(j)} = \text{round}\left(\log_2\left(\frac{\sigma_i^{(j)}}{\min(\sigma^{(j)})} \times 16\right)\right)$$

where $\min(\sigma^{(j)})$ is the minimum of the standard deviations of the j-th order eigenfeatures. Though different eigenfeature allocate different bits, the range is still remains [−128,127]. With this quantization strategy, the size of face descriptor can reduce about 40% while the retrieval accuracy drop about 1% to 2%. If the original quantization strategy is acceptable, then the further quantization is not necessary. Here a normalizing and clipping procedure example is given to further quantize and compact the feature from the equation (10-1) and each eigenfeature can be represented as unified 5 bits:

$$\hat{w}_i = \begin{cases} 0, & \text{if } \hat{w}_i/Z < -16 \\ 31, & \text{if } \hat{w}_i/Z > 15 \\ \text{round}(\hat{w}_i/Z + 16), & \text{otherwise} \end{cases}$$

where Z=16384*8 is the normalization constant from our experience.

With the above formulae, the distance between two face images $\Phi_1$, $\Phi_2$ for view-angle-invariant description, can be calculated as $$\delta(\Phi_1, \Phi_2) = \sum_{i=1}^{M_1'} \|\hat{w}_i^{(1)}(\Phi_1) - \hat{w}_i^{(1)}(\Phi_2)\| + \sum_{j=1}^{M_2} \|\hat{w}_j^{(2)}(\Phi_1) - \hat{w}_j^{(2)}(\Phi_2)\| \quad (11)$$

and the distance between two face images $\Phi_1$, $\Phi_2$ for lighting-invariant description, can be calculated as $$\delta(\Phi_1, \Phi_2) = \sum_{j=1}^{M_2} \|\hat{w}_j^{(2)}(\Phi_1) - \hat{w}_j^{(2)}(\Phi_2)\| \quad (12)$$

In order to further compact the face descriptor, variable length coding can be used to the quantized eigenfeatures. The Huffman coding and arithmetic coding can be used to do the work.

The code tables can be computed as follows:

1) for the images in the training set, calculating the eigenfeatures;
2) quantizing the eigenfeatures with the strategy discussed above;
3) for the quantized eigenfeatures with the same bit allocation, computing the probability of each quantization level;
4) calculating the variable length codes for all quantization levels;
5) calculating all code tables with the steps 3) and 4) for all bit allocation cases.

With this method, the face descriptor can be further compacted. Correspondingly, The coded face descriptor should be decoded before the distance between two face descriptors can be calculated.

Figure 4:
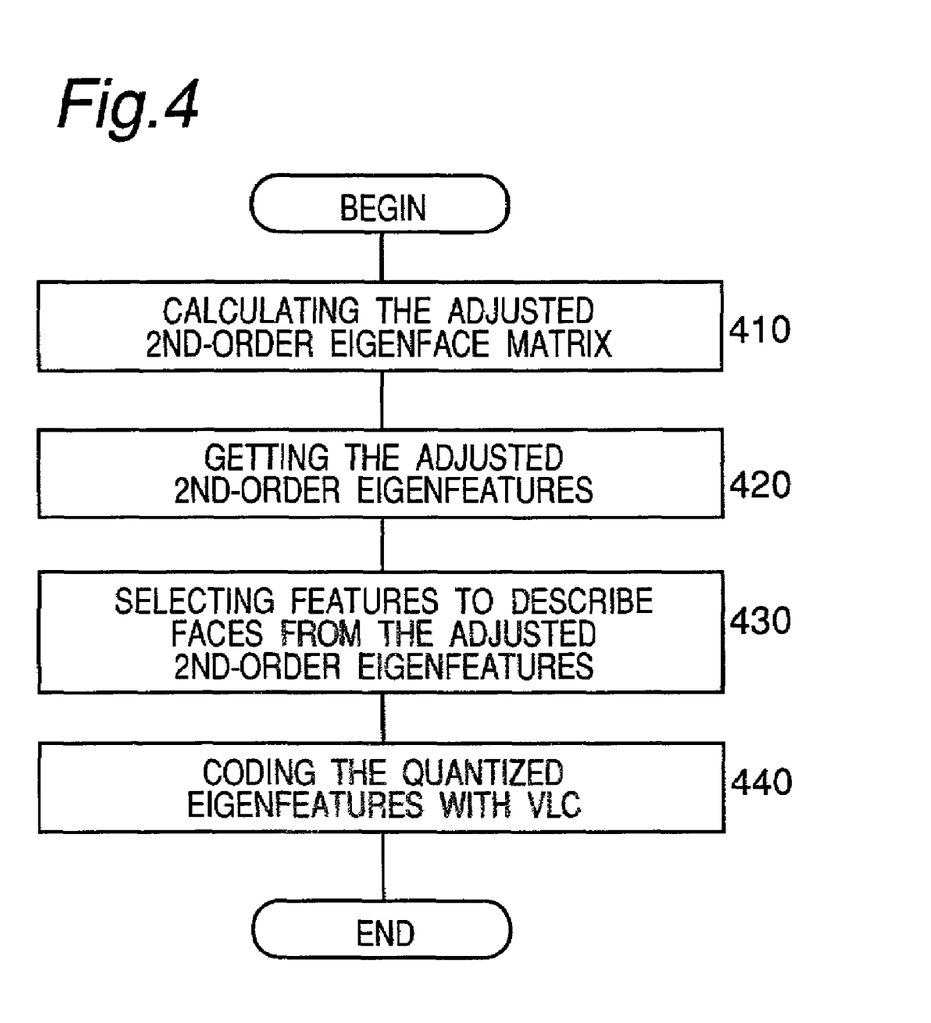
FIG. 4 shows the reconstructed faces, the corresponding original faces and the second-order residue images.
Figure 5:
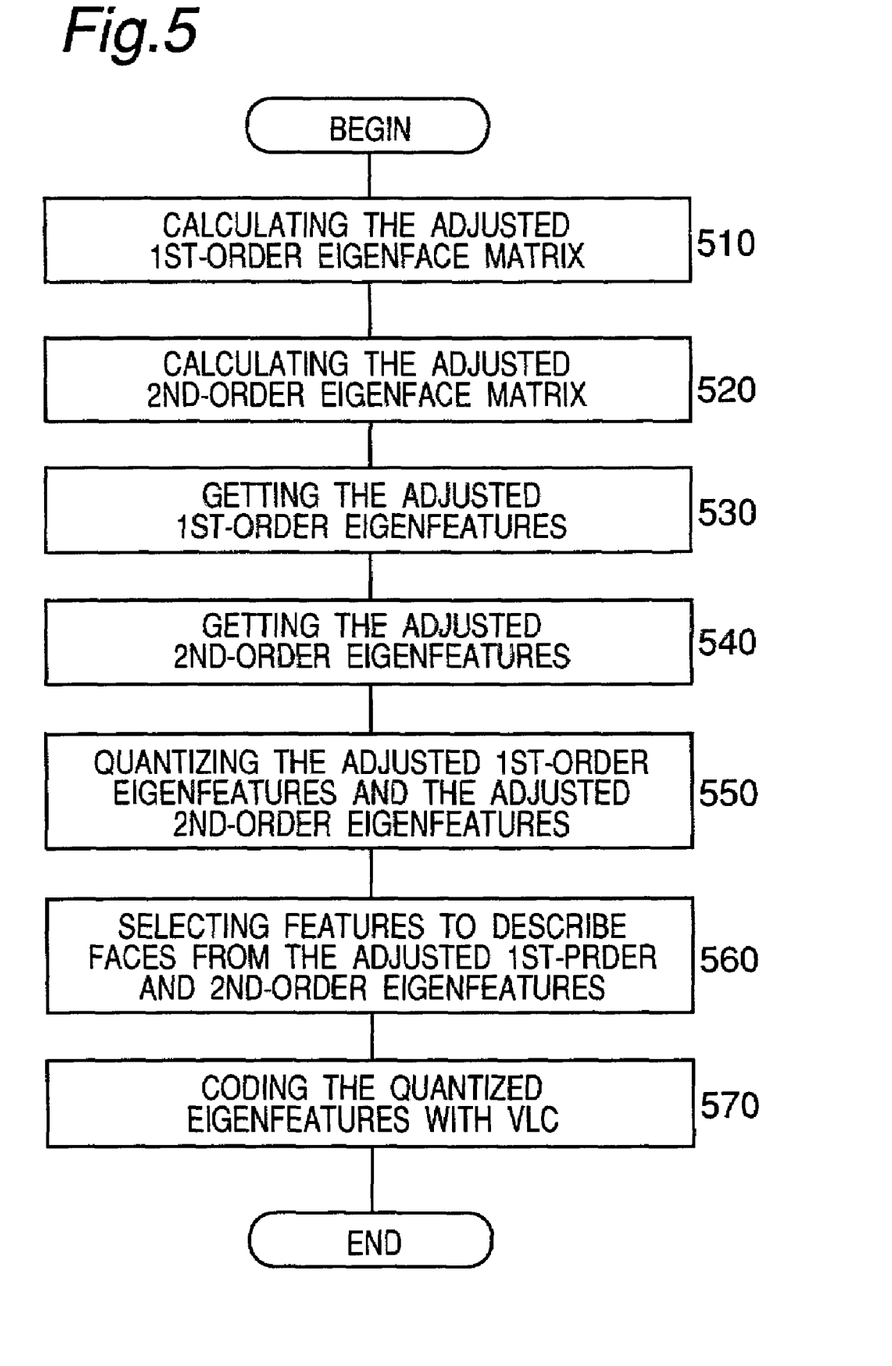
FIG. 5 shows the procedure for computing the first-order feature $W^{(1)}$.

According to our observation, the first-order eigenfeatures itself can also be used to describe view-angle- and lighting-invariant face features. The view-angle-invariant face features can be the eigenfeatures extracted from the eigenfaces corresponding to the top N largest eigenvalues. The lighting-invariant face features can be the eigenfeatures extracted from the eigenfaces corresponding to the top k-th to N-th largest eigenvalues where 0<k<N. In general, $4 \leq k \leq 10$ and $40 \leq N \leq 60$. We recommend the use of k=8, N=40 and total eigenface number is 48. FIG. 4 and FIG. 5 show, respectively, a flow chart for extracting eigenfeatures that will not be influenced by the lighting, and a flow chart for extracting eigenfeature that will not be influenced by the view-angle.

In FIG. 4 showing the method of extracting eigenfeatures that will not be influenced by the lighting, the following steps are provided.

Step 410: Calculate the adjusted second-order eigenface matrix.
Step 420: Get the adjusted second-order eigenfeatures.
Step 430: Select features to describe faces from the adjusted second-order eigenfeatures.
Step 440: Code the quantized eigenfeatures with VLC. This step can be omitted.

In FIG. 5 showing the method of extracting eigenfeature that will not be influenced by the view-angle, the following steps are provided.

Step 510: Calculate the adjusted first-order eigenface matrix.
Step 520: Calculate the adjusted second-order eigenface matrix.
Step 530: Get the adjusted first-order eigenfeatures.
Step 540: Get the adjusted second-order eigenfeatures.
Step 550: Quantize the adjusted first-order eigenfeatures and the adjusted second-order eigenfeatures.
Step 560: Select features to describe faces from the adjusted first-order and second-order eigenfeatures.
Step 570: Code the quantized eigenfeatures with VLC. This step can be omitted.

This invention is very effective for describing human faces. Since the second-order eigenfaces can be calculated only once with the training face images, the second-order features can be obtained as efficient as first-order features. Since detailed information can be revealed with high-order eigenfeatures, the performance of the combination of first-order and second-order eigenfeatures is better in view-angle-invariant face description compared with the same number of first-order eigenfeatures. The second-order eigenfeatures has much better lighting-invariant face description capability compared with the first-order eigenfeatures. This invention is very effective and efficient in describing human faces. The description method can be used in internet multimedia database retrieval, video editing, digital library, surveillance and tracking, and other applications using face recognition and verification broadly.

The present disclosure relates to subject matter contained in priority Japanese Patent Application No. 2000-385126, filed on Dec. 19, 2000, the contents of which is herein expressly incorporated by reference in its entirety.

What is claimed is:

1. A method of extracting features for a lighting-invariant face description, comprising:
    getting adjusted second-order eigenfeatures of a face image;
    quantizing the adjusted second-order eigenfeatures; and
    selecting features to construct a face descriptor to describe faces from the quantized second-order eigenfeatures.

2. A method of extracting features for a lighting-invariant face description, comprising:
    getting adjusted second-order eigenfeatures of a face image;
    quantizing the adjusted second-order eigenfeatures;
    selecting features to construct a face descriptor to describe faces from the quantized second-order eigenfeatures; and
    coding the selected eigenfeatures in a lighting-invariant face descriptor.

3. A method of extracting features for a view-angle-invariant face description, comprising:
getting adjusted first-order eigenfeatures of a face image;
getting adjusted second-order eigenfeatures of a face image;
quantizing the adjusted first-order eigenfeatures;
quantizing the adjusted second-order eigenfeatures; and
selecting features to construct a face descriptor to describe faces from the quantized first-order and second-order eigenfeatures.

4. A method of extracting features for a view-angle-invariant face description, comprising:
getting adjusted first-order eigenfeatures;
getting adjusted second-order eigenfeatures;
quantizing the adjusted first-order eigenfeatures;
quantizing the adjusted second-order eigenfeatures;
selecting features to construct a face descriptor to describe faces from the quantized first-order and second-order eigenfeatures; and
coding selected eigenfeatures in a view-angle-invariant face descriptor.

5. The method of claim 1, wherein getting adjusted second-order eigenfeatures of a face image comprising:
getting a dot product of the face image and an adjusted second-order eigenface matrix.

6. The method of claim 3, wherein getting adjusted first-order eigenfeatures of a face image comprises:
getting a dot product of the face image and an adjusted first-order eigenface matrix.

7. The method of claim 6, further comprising computing an adjusted first-order eigenface matrix by:
calculating a first-order eigenface matrix; and
adjusting the first-order eigenface matrix.

8. The method of claim 5, further comprising computing the adjusted second-order eigenface matrix by:
calculating a second-order eigenface matrix; and
adjusting the second-order eigenface matrix.

9. The method of claim 7, wherein adjusting the first-order eigenfaces comprises:
getting first-order eigenfeatures of training face images;
arranging the first-order eigenface as a two dimensional array of original images;
getting a mirrored eigenface of the two dimensional array;
weighting the mirrored eigenface image;
adding the weighted eigenface image to the first-order eigenface;
re-arranging the first-order eigenface to obtain a one-dimensional adjusted first-order eigenface;
normalizing adjusted first-order eigenface;
getting weights of adjusted first-order eigenfeatures for a distance computation;
multiplying the weights of the first-order eigenfeatures for distance computation to adjusted first-order eigenface matrix; and
quantizing the first-order eigenface matrix.

10. The method of claim 8, wherein calculating second-order eigenfaces comprises:
calculating a first-order eigenface matrix;
getting first-order eigenfeatures from training face images;
calculating a pseudo-inverse of the first-order eigenface matrix;
calculating first-order reconstructed face images by multiplying the first-order eigenfeatures to the pseudo-inverse of the first-order eigenface matrix;
getting second-order residue images by subtracting the first-order reconstructed face images from original images; and
getting the second-order eigenfaces by calculating eigenvectors of the second-order residue images.

11. The method of claim 8, wherein adjusting second-order eigenfaces comprises:
getting second-order eigenfeatures of training images by computing dot products of face images and second-order eigenfaces;
re-shaping the second-order eigenfaces to an original image shape and getting left-right mirrored eigenface images;
weighting the mirrored eigenface images and adding them to corresponding original image shaped second-order eigenface images;
re-arranging original image shaped second-order eigenfaces to obtain one-dimensional adjusted second-order eigenfaces;
normalizing adjusted second-order eigenfaces;
getting weights of second-order eigenfeatures for a distance computation;
multiplying the weights of second-order eigenfeatures for the distance computation to adjusted second-order eigenface matrix; and
quantizing the second-order eigenface matrix.

12. The method of claim 9, wherein quantizing the first-order eigenface matrix comprises:
getting a maximum and a minimum of adjusted first-order eigenface matrix;
getting a quantization by dividing an interval between the maximum and the minimum into a plurality of quantization levels;
dividing the adjusted first-order eigenface matrix with the quantization; and
rounding divided values to nearest integers.

13. The method of claim 11, wherein quantizing the second-order eigenface matrix comprises:
getting a maximum and a minimum of said adjusted second-order eigenface matrix;
getting a quantization by dividing an interval between the maximum and the minimum into a plurality of quantization levels;
dividing the adjusted second-order eigenface matrix with the quantization; and
rounding divided values to nearest integers.

14. The method of claim 1, wherein getting adjusted second-order eigenfeatures comprises:
getting a recovered adjusted second-order eigenface by multiplying the quantized second-order eigenface matrix with a quantization; and
getting second-order eigenfeatures by multiplying each column-wise recovered adjusted second-order eigenface with a row-wise image.

15. The method of claim 3, wherein getting adjusted first-order eigenfeatures comprises:
getting a recovered adjusted first-order eigenface by multiplying the quantized first-order eigenface matrix with a quantization; and
getting first-order eigenfeatures by multiplying each column-wise recovered adjusted first-order eigenface with a row-wise image.

16. The method of claim 1, wherein quantizing adjusted second-order eigenfeatures comprises:
getting a maximum and a minimum of the adjusted second-order eigenfeatures of training images;

getting the quantization by dividing an interval between the maximum and the minimum into a plurality of quantization levels;

dividing adjusted second-order eigenfeatures with the quantization; and rounding divided values to nearest integers.

17. The method of claim 1, wherein quantizing adjusted second-order eigenfeatures comprises:

getting a maximum and a minimum of adjusted second-order eigenfeatures of training images;

getting the quantization by dividing an interval between the maximum and the minimum into a plurality of quantization levels;

dividing adjusted second-order eigenfeatures with the quantization;

rounding divided values to nearest integers;

allocating different number of bits to different eigenfeatures by computing a rounded logarithm of a standard deviation of corresponding eigenfeatures in a training set divided by a minimum of the standard deviations; and quantizing the eigenfeatures according to the corresponding bit allocation.

18. The method of claim 3, wherein quantizing adjusted first-order eigenfeatures comprises:

getting a maximum and a minimum of adjusted first-order eigenfeatures of training images;

getting the quantization by dividing an interval between the maximum and the minimum into a plurality of quantization levels;

dividing the adjusted first-order eigenfeatures with the quantization; and rounding divided values to nearest integers.

19. The method of claim 3, wherein quantizing adjusted first-order eigenfeatures comprises:

getting a maximum and a minimum of adjusted first-order eigenfeatures of training images;

getting the quantization by dividing an interval between the maximum and the minimum into a plurality of quantization levels;

dividing the adjusted first-order eigenfeatures with quantization;

rounding divided values to nearest integers;

allocating different number of bits to different eigenfeatures by computing a rounded logarithm of a standard deviation of corresponding eigenfeatures in a training set divided by a minimum of the standard deviations; and quantizing eigenfeatures according to the corresponding bit allocation.

20. The method of claim 9, wherein getting weights of adjusted first-order eigenfeatures for a distance computation comprises:

getting standard deviations of adjusted first-order eigenfeatures of training face images; and getting weights by extracting square roots of standard deviations.

21. The method of claim 11, wherein getting weights of adjusted second-order eigenfeatures for a distance computation comprises:

getting variances of adjusted second-order eigenfeatures of training face images; and getting weights of adjusted second-order eigenfeatures by extracting square roots of said variances.

22. A method of measuring lighting-invariant similarity between faces, comprising:

extracting eigenfeatures of faces for a lighting-invariant face description with the method of claim 1;

getting Euclidean distances of eigenfeatures of the faces; and choosing a smallest Euclidean distance to indicate a best matching pair of faces.

23. A method of measuring a view-angle-invariant similarity between faces, comprising:

extracting eigenfeatures of faces for a view-angle-invariant face description with the method of claim 3;

getting Euclidean distances of eigenfeatures of the faces; and choosing a smallest Euclidean distance to indicate a best matching pair of faces.

24. A method of getting code tables of variable length coding (VLC) for a light-invariant face descriptor, comprising:

getting quantized eigenfeatures of a training set with the method of claim 1;

classifying eigenfeatures into groups depending on bit allocations; and constructing a code table for each group of eigenfeatures with the same bit allocation, using an entropy coding method.

25. A method of getting code tables of variable length coding (VLC) for a view-angle-invariant face descriptor, comprising:

getting quantized eigenfeatures of a training set with the method of claim 3;

classifying eigenfeatures into groups depending on bit allocations; and constructing a code table for each group of eigenfeatures with the same bit allocation, using an entropy coding method.

26. The method of claim 24, wherein the entropy coding method comprises a Huffman coding method based on a probability of a quantization level.

27. The method of claim 24, wherein the entropy coding method comprises an Arithmetic coding method based on a probability of a quantization level.

28. The method of claim 1, further comprising coding a lighting-invariant face descriptor by:

looking up a code table generated for each quantized eigenfeature and using a corresponding code word to represent the quantized eigenfeature.

29. The method of claim 3, further comprising coding a viewing-angle-invariant face descriptor by:

looking up a code table generated for each quantized eigenfeature and using a corresponding code word to represent the quantized eigenfeature.

30. A method of extracting features for a general face description, comprising:

getting adjusted first-order eigenfeatures of a face image with the method in claim 7;

quantizing adjusted first-order eigenfeatures; and selecting features to construct face descriptor to describe faces from the quantized first-order eigenfeatures.

31. A method of extracting features for general face description, comprising:

getting adjusted first-order eigenfeatures of a face image with the method in claim 7;

quantizing adjusted first-order eigenfeatures;

selecting features to construct face descriptor to describe faces from the quantized first-order eigenfeatures; and coding selected eigenfeatures in the face descriptor.

32. The method of claim 30, wherein selecting features to construct a face descriptor to describe faces from the quantized first-order eigenfeatures comprises:

selecting eigenfeatures corresponding to a top N largest eigenvalues for a view-angle invariant face description.

33. The method of claim 30, wherein selecting features to construct a face descriptor to describe faces from the quantized first-order eigenfeatures comprises:

selecting eigenfeatures corresponding to a k-th to N-th largest eigenvalues (0<k<N) for a lighting-invariant face description.

34. A method of lighting-invariant a view-angle-invariant face description, comprising:

getting first-order residual image data $\Gamma^{(1)}$, by taking face image data $\Phi$ as a vector and calculating its difference from a mean face image data $\Psi$;

multiplying the first-order residual image data $\Gamma^{(1)}$ and a combination of a first-order eigenmatrix obtained by decomposing the first-order residual image data $\Gamma^{(1)}$, and a second-order eigenmatrix obtained by decomposing second-order residual image data $\Gamma^{(2)}$ obtained by subtracting first-order reconstructed image data from original face image data $\Phi$, where the first-order reconstructed image data is obtained by adding mean face image data $\Psi$ and a substantial low-frequency component extracted from the first-order residual image data $\Gamma^{(1)}$, taking a result of the multiplication as an eigenfeature of the face image data $\Phi$;

quantizing the eigenfeature;

encoding the quantized eigenfeature into variable length codes; and taking a result of encoding as the face descriptor.

* * * * *

UNITED STATES PATENT AND TRADEMARK OFFICE
CERTIFICATE OF CORRECTION

PATENT NO.        : 6,996,257 B2                                          Page 1 of 1
APPLICATION NO. : 10/020293
DATED             : February 7, 2006
INVENTOR(S)       : L. Wang It is certified that error appears in the above-identified patent and that said Letters Patent is hereby corrected as shown below:

At column 11, line 50 (claim 9, line 12) of the printed patent, after "normalizing" insert ---the---.

At column 11, line 54 (claim 9, line 16) of the printed patent, after "to" insert ---the---.

At column 12, line 20 (claim 11, line 15) of the printed patent, after "normalizing" insert ---the---.

At column 12, line 24 (claim 1, line 19) of the printed patent, after "to" insert ---the---.

Signed and Sealed this

Fifth Day of September, 2006

JON W. DUDAS
*Director of the United States Patent and Trademark Office*